(12) United States Patent
Babaian et al.

(10) Patent No.: US 6,516,463 B2
(45) Date of Patent: *Feb. 4, 2003

(54) METHOD FOR REMOVING DEPENDENT STORE-LOAD PAIR FROM CRITICAL PATH

(75) Inventors: Boris A. Babaian, Moscow (RU); Sergey K. Okunev, Moscow (RU); Vladimir Y. Volkonsky, Moscow (RU)

(73) Assignee: Elbrus International Limited, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,482

(22) Filed: Jan. 25, 2001

(65) Prior Publication Data

US 2002/0066090 A1 May 30, 2002

Related U.S. Application Data

(63) Continuation of application No. 09/506,408, filed on Feb. 17, 2000.
(60) Provisional application No. 60/120,353, filed on Feb. 17, 1999, provisional application No. 60/120,357, filed on Feb. 17, 1999, provisional application No. 60/120,375, filed on Feb. 17, 1999, provisional application No. 60/120,448, filed on Feb. 17, 1999, provisional application No. 60/120,527, filed on Feb. 17, 1999, and provisional application No. 60/120,649, filed on Feb. 17, 1999.

(51) Int. Cl.$^7$ .............................................. G06F 9/45
(52) U.S. Cl. ...................................... 717/156; 717/159
(58) Field of Search ................................ 717/140, 151, 717/154, 155, 156, 157, 159, 160, 161

(56) References Cited

U.S. PATENT DOCUMENTS

| | | | | |
|---|---|---|---|---|
| 4,567,574 A | * | 1/1986 | Saade et al. | |
| 5,107,418 A | * | 4/1992 | Cramer et al. | 395/709 |
| 5,542,075 A | * | 7/1996 | Ebcioglu et al. | 395/709 |
| 5,557,761 A | | 9/1996 | Chan et al. | |
| 5,613,121 A | * | 3/1997 | Blainey | 395/709 |
| 5,625,835 A | | 4/1997 | Ebcioglu et al. | |
| 5,758,051 A | | 5/1998 | Moreno et al. | |
| 5,790,862 A | * | 8/1998 | Tanaka et al. | 395/705 |
| 5,805,894 A | * | 9/1998 | Robison | 395/709 |
| 5,943,499 A | * | 8/1999 | Gillies et al. | 395/709 |
| 6,038,657 A | * | 3/2000 | Favor et al. | 712/216 |
| 6,094,713 A | * | 7/2000 | Khadder et al. | 711/210 |
| 6,108,770 A | * | 8/2000 | Chrysos et al. | 712/216 |
| 6,128,775 A | * | 10/2000 | Chow et al. | 717/9 |
| 6,139,199 A | * | 10/2000 | Rodriguez | |
| 6,151,704 A | * | 11/2000 | Radigan | 717/9 |
| 6,243,864 B1 | * | 6/2001 | Odani et al. | 717/9 |

OTHER PUBLICATIONS

Kolte et al., "Load/Sore range analysis for global register allocation", ACM, 1993, pp. 268–277.*

Schlansker et al., "Height reduction of control recurrences for ILP processors", ACM, 1994, pp. 40–50.*

"A Framework for Balancing Control Flow and Prediction," Aug. et al., 1072–4451/97 ©IEEE.

* cited by examiner

Primary Examiner—Kakali Chaki
(74) Attorney, Agent, or Firm—Fidel D. Nwamu; Townsend and Townsend and Crew LLP

(57) ABSTRACT

A method, implemented by a compiler, for removing a store-load dependency from a critical path utilizes a compare address operation to determine at run time whether dependency actual exists. The operand to be stored is held in a temporary register and provided directly to the operations, using load operation result, in dependence on the value of the compare address operation result, so that the dependency is removed.

4 Claims, 2 Drawing Sheets

METHOD FOR REMOVING DEPENDENT STORE-LOAD PAIR FROM CRITICAL PATH

CROSS-REFERENCES TO RELATED APPLICATIONS

This application is a continuation of and claims the benefit of U.S. application Ser. No. 09/506,408, filed Feb. 17, 2000, which is a continuation of U.S. application Ser. Nos. 60/120,353, 60/120,357, 60/120,375, 60/120,448, 60/120,527 and 60/120,649, all filed Feb. 17, 1999, the disclosures of which are each incorporated herein by reference.

BACKGROUND OF THE INVENTION

Compiler optimization has as its goal transforming code to increase its performance. One important factor in optimization is scheduling operations to increase the speed of program execution by utilizing predicated and speculative operations. The present invention relates to optimizing code executed on an Explicit Parallel Instruction Computing (EPIC) architecture with full predication and speculation support and performs the global task of detecting and refining potential parallelism of the source code being compiled.

The present compiler transforms the source-code program represented as a set of Basic Blocks into Extended Scalar Blocks (ESBs) by applying a compiler technique called if-conversion which replaces conditional branches in the code with comparison instructions which set a predicate. Each predicated instruction is guarded by a Boolean source operand having a value which determines whether the instruction is executed or nullified.

Extended Scalar Blocks are regions of the predicated code where all dependencies between operations are represented explicitly as a relation between two operations for a considerable number of operations. For each ESB the compiler works out the critical path which is defined as a sequence of operations that will take the longest CPU time and cannot be executed in parallel because of dependencies.

Various types of dependencies increase the length of the critical path and therefore decrease the execution speed. Especially important are dependencies between operations with dynamic access time such as load and store operations which are affected by memory latency. Resolving problems of such possible or ambiguous dependencies is critical to execute multiple memory operations in parallel and out of order, and, accordingly, to increase resource utilization and to reduce the effects of long memory latencies.

There are a number of existing methods to perform memory disambiguation and to solve the problem of reordering memory operations. In the last decade many of them were intended to do this at run-time and also using a special memory disambiguation buffer, where run-time memory address comparison is made. These methods may be effective enough, though they require a complex compiler technique to retrieve correct execution, when conflict through memory addresses of reordered operations really occur. Examples of such techniques are described in U.S. Pat. No. 5,625,835, entitled "Method and Apparatus for Reordering Memory Operations in a Superscalar or Very Long Instruction Word Processor" and U.S. Pat. No. 5,758,051, entitled "Method and Apparatus for Reordering Memory Operations in a Processor."

SUMMARY OF THE INVENTION

Advantages of the present invention over existing methods, using memory disambiguation apparatus include: 1) universal usage (less dependent on conflict probability); 2) effective usage of predicated mode of operation execution while transforming code; 3) algorithmic simplicity; 4) compensation code is not needed.

According to one aspect of the invention, a memory address comparison operation is inserted in the same block and executed in parallel with other operations of the block. Additional number of operations according to this aspect is fixed for any case (compiler driven). It is more (by one or two operations) than another method in case when no memory conflict occur, and is significantly less when it is, because of control transfer to compensation code in using disambiguation buffer. All methods, including static memory disambiguation techniques as basis, may be used and correlated in modern compilers and architectures to reach high performance.

According to one aspect of the invention, a compiler reduces the length of the critical path by removing a possible dependency between a store-load pair. The predecessor to the store operation and the load operation are scheduled in parallel and the operands output by those operations are predicated on the result of an address comparison instruction.

According to another aspect of the invention, the operand to be stored is held in a temporary register.

According to another aspect of the invention, if the address comparison instruction indicates the store and load addresses of the store and load instructions are the same, the loaded operand is nullified and the operand calculated by the store predecessor operation is input to a load successor operation.

According to another aspect of the invention, if the address comparison instruction indicates that the store and load addresses are different the loaded operand is input to the load successor operation and the operand to be stored is stored by a store instruction.

Other features and advantages of the invention will be apparent in view of the following detailed description and appended drawings.

DESCRIPTION OF THE SPECIFIC EMBODIMENTS

A specific example illustrating the operation of a preferred embodiment of the invention will now be described.

Figure 1:
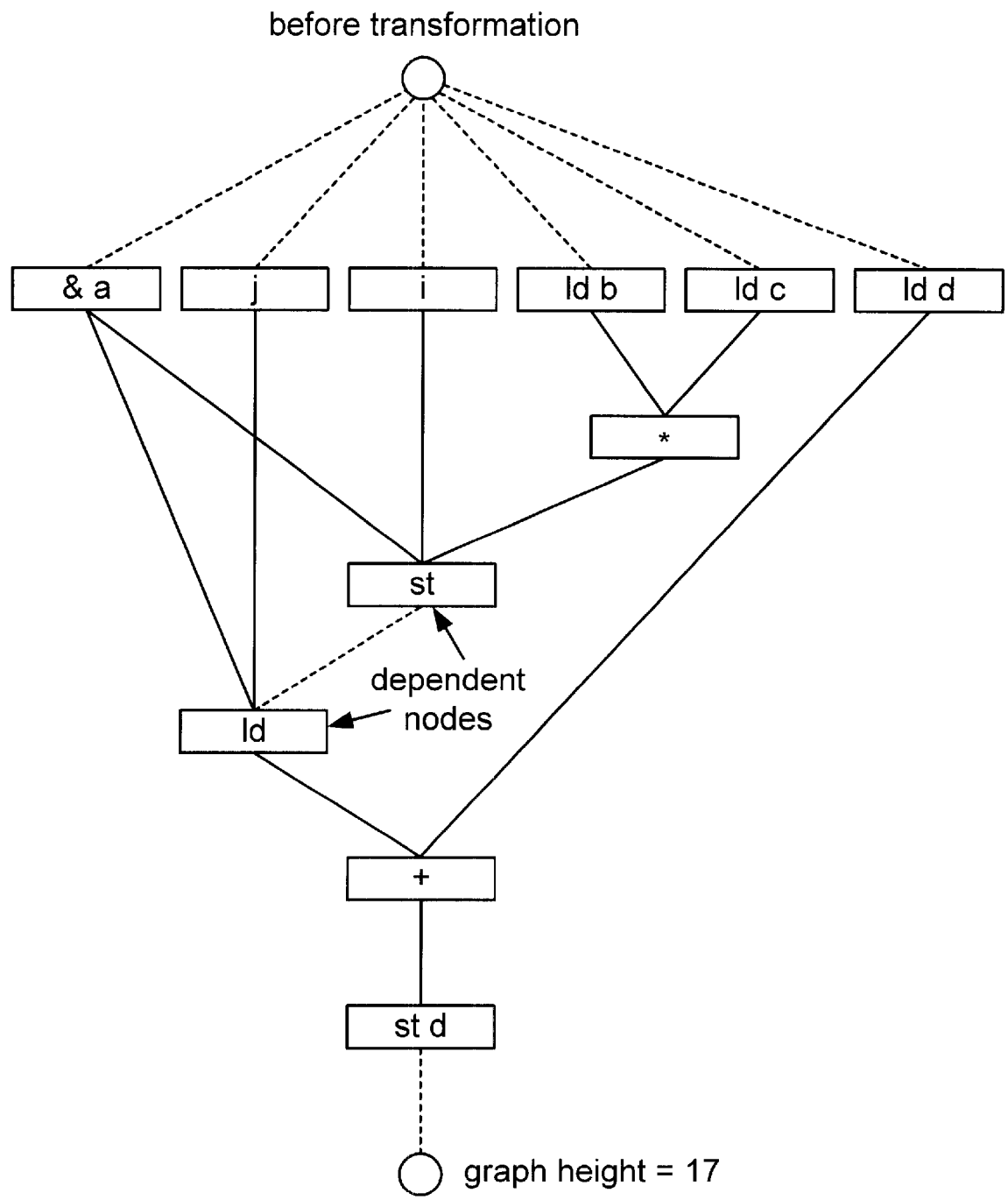
FIG. 1 depicts a dependence graph and code segment of a block having a store-load chain with unknown dependence prior to transformation.

FIG. 1 depicts a code fragment illustrating the occurrence of a store-load dependency and a dependence graph based on the code fragment. The input values necessary to perform the subsequent operations are depicted in the top row of the figure of the dependence graph. These operands include, from left to right, the beginning address of the array (&a), the indices (j and i), and the numerical values (b, c, and d).

The first operation performed is the store predecessor operation which forms the product b*c. The store operation (st) utilizes &a and i to calculate the address of a[i] and stores the product at that address. The load operation (ld) utilizes &a and j to calculate the address of a[j] and retrieve from memory the value of a load operand stored at that address. The successor to the load operation adds the load operand to the value d and assigns the sum to d. Finally, a second store operand stores the variable d at a memory location.

The scheduling of the load must be delayed until memory access processing of the store begins because i and j might be equal. In that case the correct value to a[j] to be added to d by load successor operation would be b*c. However, if the value of a[j] is retrieved before a[i] is stored then some incorrect value would be retrieved from memory.

Since load and store operations must access memory these operations typically have a latency of several cycles, compile time unknown. Therefore, since the dependency requires that the operations be performed sequentially the height of graph is increased.

Figure 2:
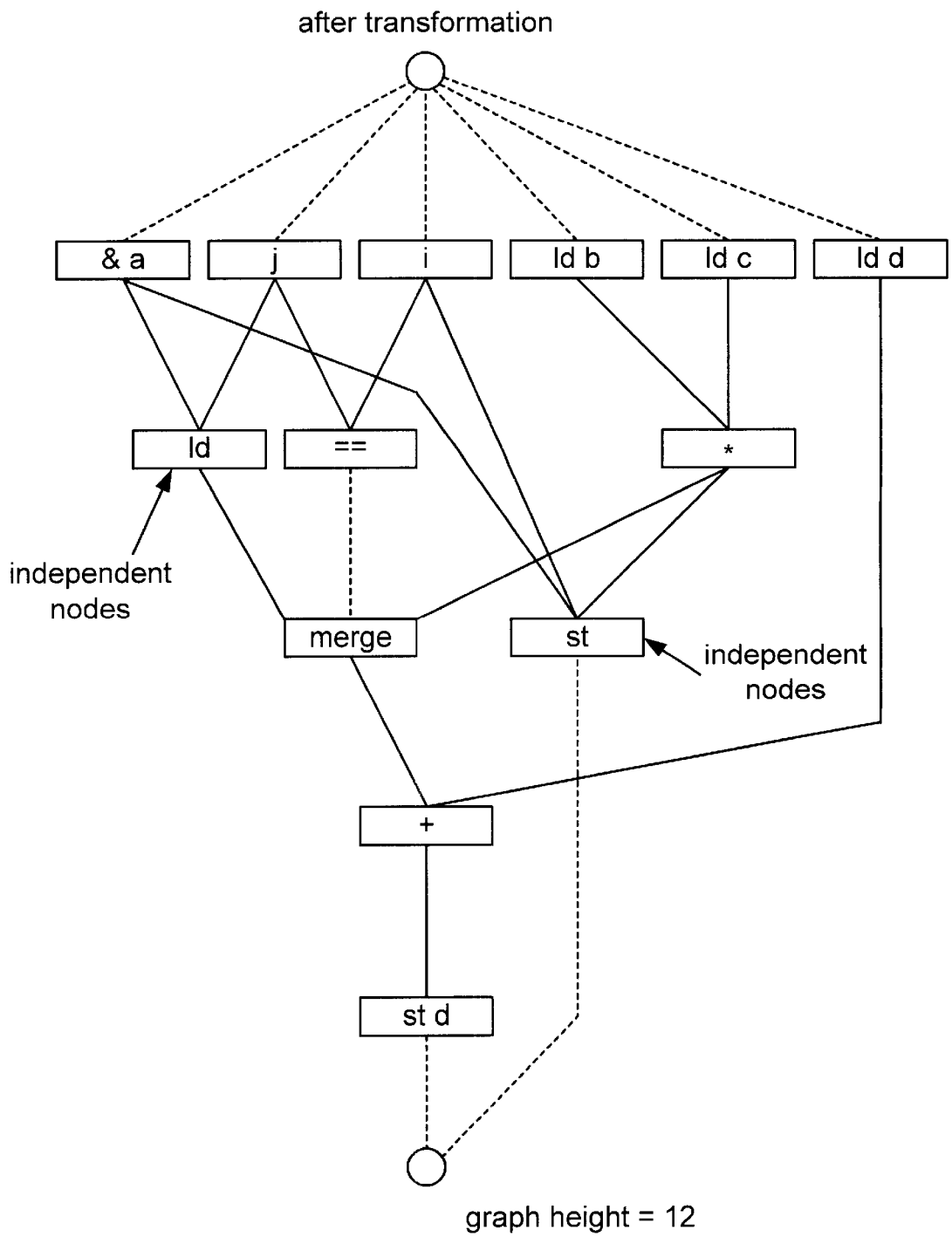
FIG. 2 depicts a dependence graph and code segment of a block after transformation with the store-load dependency removed.

FIG. 2 includes a code fragment and dependence graph depicting the result of implementing a preferred embodiment of the invention. The load a[j], r0=b*c operations, and an address compare operation are performed in parallel. In this case, the address compare compares the indices (i and j) supplied at runtime since the base addresses of the operations (&a) are equal. The load and (*) operands are predicated on the result of the address compare operation.

The merge operation selects the output operand from either load or (*) based on the outcome of the comparison of the indices, which in this case determines whether the store and load addresses are the same. The store operation, which writes the value of b*c, kept on r0, to a[i] is performed in parallel with the merge operation.

If i==j then the value calculated by the store predecessor is to be passed as an input value to the load successor operation. Accordingly, the merge operation passes the value of r0 (b*c), calculated by the store predecessor operation (*), as one input operand to the load successor operation (+). The sum of d and r0 (=b*c) is the calculated and stored.

If i~=j then the value loaded by the load operation is not the same as the value to be stored by the store operation. Accordingly, the merge operation passes the value loaded from a[j] to the load successor operation (+). The sum of a[i] and d is assigned to d by the store d operation.

Thus, the dependency between the store and load has been removed by exploiting instruction level parallelism in the ESB and predicated execution. The height of the ESB is significantly reduced, in this case by 5 cycles thereby increasing the execution speed of the ESB.

In the currently described embodiment, in FIG. 2 load and (*) operations are predicated on the result of the compaddr instruction. The merge operation will pass either the operand from the load or (*) operation depending on the Boolean result of the compaddr instruction.

In general, the possible dependence between the store-load chain occurs when the load operation accesses an operand from a memory location at a load address before the completion of the store operation and it is possible that the store operation stores the stored operand in the same memory location. In the case where the storage locations are the same, correct execution of the code requires that store be completed prior to the load. This possible (ambiguous) dependence prevents compiler from reordering the store and load operations so that execution is performed in sequential order. Thus, the execution time and the length of critical path are increased.

In the currently described embodiment, the critical path is modified so that the load operation is scheduled to complete independently of the scheduling of the store operation. The store predecessor operation, in the above described example b*c, is scheduled in parallel with the load, calculates the operand value to be stored, and its result operand is held in a temporary register. The correct value required by the load successor operation depends on whether the first and second addresses are equal.

Thus, the loaded operand and result operand are both predicated by the same Boolean variable having a value determined by a compare address operation. If the addresses are the same then the result operand must be passed to load successor operation and the loaded operand is nullified. If the addresses are different then the loaded operand is passed to the load successor operation and the result operand is not passed through the merge operation and is stored by the store operation.

In a preferred embodiment, the acts described above are performed by a compiler in the form of program code executed by a processor. The program code is stored in a computer readable medium such as magnetic storage, optical storage, CD ROM, digital signals encoded in electromagnetic signals, etc.

The invention has now been described with reference to the preferred embodiments. Alternatives and substitutions will now be apparent to persons of skill in the art. Accordingly, it is not intended to limit the invention except as provided by the appended claims.

What is claimed is:

1. A method, performed by a compiler, for reducing the critical path of a block in a dependence graph, with the dependence graph including a store predecessor operation that outputs a first output operand, a store operation that receives said first output operand and stores the first output operand at a first storage location having a first address, and a load operation, executed after said store operation, for loading a second output operand from a storage location having a second address, where the load operation depends on the store operation if the second and first addresses are equal, and a load successor operation that receives the second operand as an input operand, said method comprising the steps of:

scheduling store predecessor and load operations to output the first and second operands respectively;

predicating the second output operand and the first output operand on the outcome of an address compare operation;

scheduling an address comparison operation to generate a Boolean operand having a first value if the first and second addresses are equal and a second value if the first and second addresses are not equal; and selecting the first output operand as the input operand of the load successor operation if the Boolean operand has said first value or said second output operand as the input operand of the load successor operation if the Boolean operand has the second value.

2. A method, performed by a compiler, for reducing the critical path of a block in a dependence graph, with the dependence graph including a store predecessor operation that outputs a first output operand, a store operation that receives said first output operand and stores the first output operand at a first storage location having a first address, and a load operation, executed after said store operation, for loading a second output operand from a storage location having a second address, where the load operation depends on the store operation if the second and first addresses are equal, and a load successor operation that receives the second operand as an input operand, said method comprising the steps of:

scheduling a store predecessor and load operations to output the first and second operands respectively;

predicating the second output operand and the first output operand on the outcome of an address compare operation;

scheduling an address comparison operation to generate a Boolean operand having a first value if the first and second addresses are equal and a second value if the first and second addresses are not equal;

selecting the first output operand as the input operand of the load successor operation if the Boolean operand has said first value or said second output operand as the input operand of the load successor operation if the Boolean operand has the second value; and wherein said first and second storage locations are array elements of the same array indexed by i and j respectively and where said act of scheduling a comparison operation further comprises scheduling a comparison operation that compares i and j and sets the Boolean value to said first value when i=j and to the second value when i~=j.

3. A computer program product comprising:

a computer readable medium having program code, embodied therein, for reducing the critical path of a block in a dependence graph, with the dependence graph including a store predecessor operation that outputs a first output operand, a store operation that receives said first output operand and stores the first output operand at a first storage location having a first address, and a load operation, executed after said store operation, for loading a second output operand from a storage location having a second address, where the load operation depends on the store operation if the second and first addresses are equal, and a load successor operation that receives the second operand as an input operand, said program code comprising:

program code for, when executed by a processor, scheduling store predecessor and load operations to output the first and second operands respectively;

program code for, when executed by a processor, predicating the second output operand and the first output operand on the outcome of an address compare operation;

program code for, when executed by a processor, scheduling an address comparison operation to generate a Boolean operand having a first value if the first and second addresses are equal and a second value if the first and second addresses are not equal; and program code for, when executed by a processor, selecting the first output operand as the input operand of the load successor operation if the Boolean operand has said first value or said second output operand as the input operand of the load successor operation if the Boolean operand has the second value.

4. The computer program product of claim 3 wherein said first and second storage locations are array elements of the same array.

* * * * *